United States Patent [19]

McNaney

[11] 4,128,308
[45] Dec. 5, 1978

[54] OPTICAL SYSTEM FOR CHANGING THE CROSS SECTIONAL DIMENSIONS OF A COLLIMATED BEAM OF LIGHT

[76] Inventor: Joseph T. McNaney, 8548 Boulder Dr., La Mesa, Calif. 92041

[21] Appl. No.: 787,619

[22] Filed: Apr. 14, 1977

[51] Int. Cl.² .............................................. G02B 5/04
[52] U.S. Cl. .................................................... 350/286
[58] Field of Search .................... 350/182, 286, 287; 331/94.5 C, 94.5 D

[56] References Cited

U.S. PATENT DOCUMENTS

| | | | |
|---|---|---|---|
| 3,609,590 | 9/1971 | Jernigan | 331/94.5 C |
| 4,016,504 | 4/1977 | Klauminzer | 350/286 X |

FOREIGN PATENT DOCUMENTS

| | | | |
|---|---|---|---|
| 1162870 | 8/1969 | United Kingdom | 350/286 |
| 502356 | 8/1976 | U.S.S.R. | 350/286 |

OTHER PUBLICATIONS

Mannigel: Optical Engineering, vol. 13, No. 4, Jul.-/Aug. 1974, pp. G160-G161.

Primary Examiner—F. L. Evans

[57] ABSTRACT

An optical system for providing changes in the cross sectional dimensions of a substantially collimated monochromatic beam of light directed along an input path of the system in relation to the dimensions thereof along the output path of the system. For example, either increasing or decreasing the beam diameter of a laser source of radiant energy is representative of an area of usefulness.

3 Claims, 7 Drawing Figures

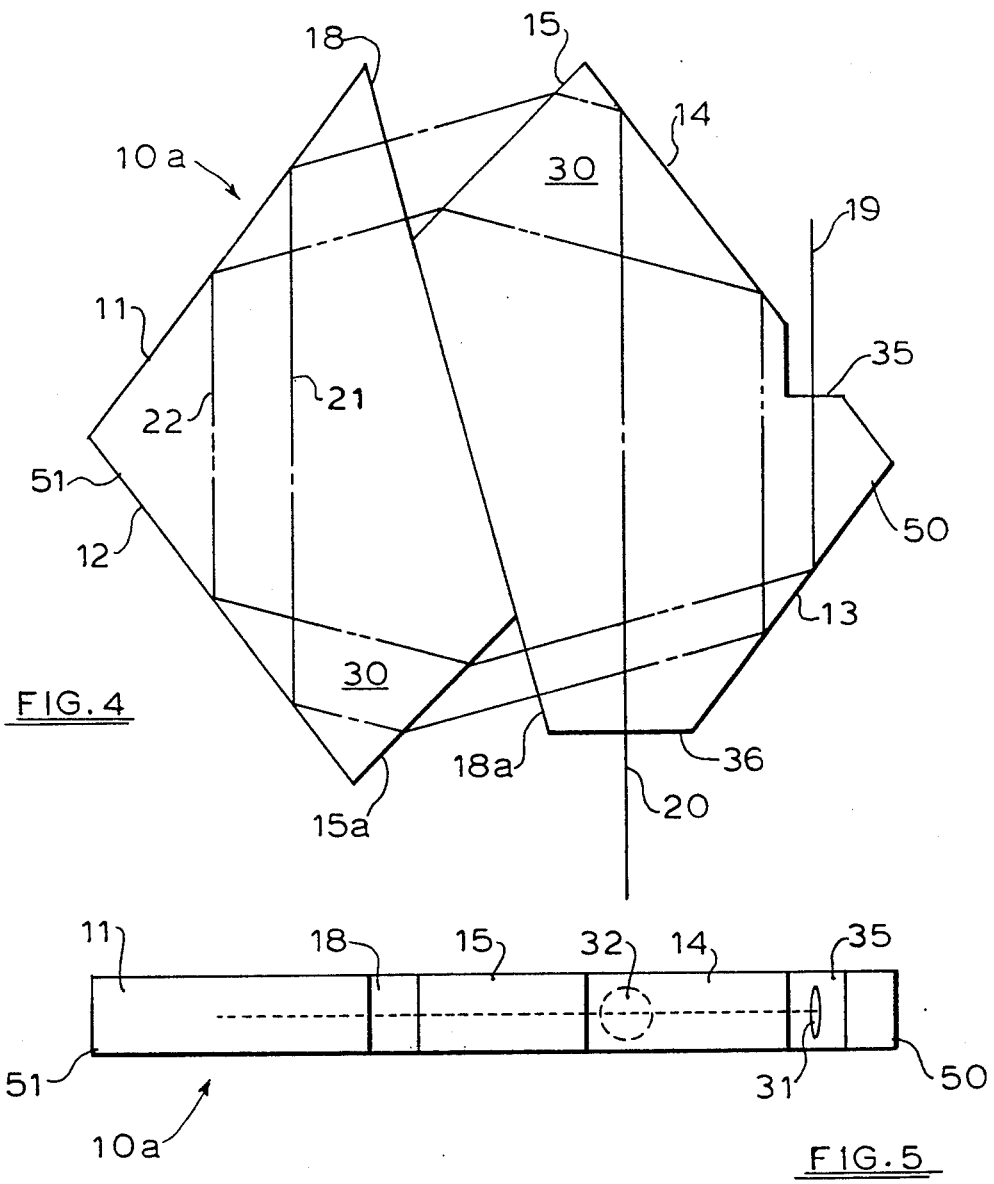

OPTICAL SYSTEM FOR CHANGING THE CROSS SECTIONAL DIMENSIONS OF A COLLIMATED BEAM OF LIGHT

SUMMARY OF THE INVENTION

The present invention relates to optical systems for effecting a change in the diameter or cross sectional dimensions of substantially collimated monochromatic beams of light. More particularly, it includes optical means for effecting such changes without disturbing the original parallelism of the light beam. In at least one embodiment, the invention involves the use of an interface of first and second light conducting materials presenting, respectively, first and second indices of refraction positioned in the path of a beam of light. The light beam when incident on the interface at the Brewster angle, for example, the refracting of light thereat allows a passing of light obliquely from one material to the other effecting changes in the cross sectional dimensions thereof corresponding to the angle of incidence of said light beam. The invention includes supporting the interface within an array of light reflecting surfaces each optically related one with respect to the other and to the interface whereby said passing of light occurs repeatedly through the interface so as to effect a progression of changes in the cross section of the beam of light. An object of the invention is to utilize the additive effect of a plurality of such passings of the beam through a common interface and allowing it to manifest itself at the output of the array of surfaces as a substantial modification of the initial cross sectional dimensions of the beam. It is also an object of the invention to effect such changes while maintaining the original light beam parallelism. A further object is to provide an optical system capable of meeting the above objectives wherein overall material bulk and space requirements have been reduced to a minimum.

The invention is illustrated herein to show by way of example the various ways of meeting these objectives. The description which follows when read in connection with the drawings hereof will provide a better understanding of these objectives as well as an understanding of other advantages included in the invention.

BRIEF DESCRIPTION OF THE DRAWINGS

FIGS. 4 and 5 are diagram representations of another embodiment of the invention, illustrating first and second views thereof;

DESCRIPTION OF THE INVENTION

Figure 1:
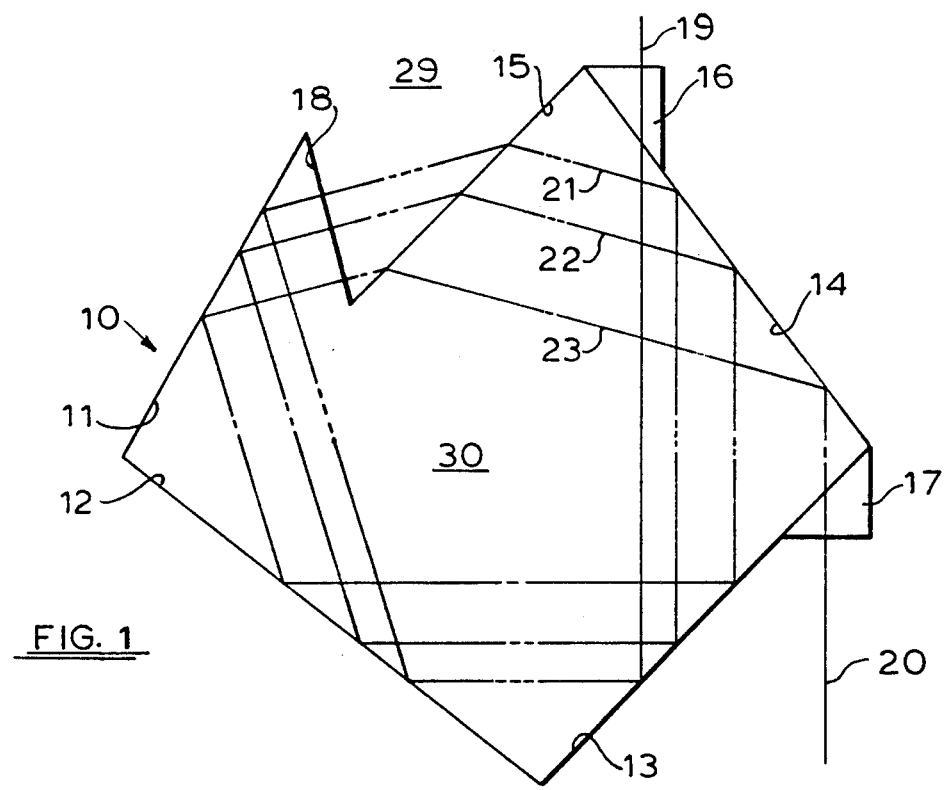
FIGS. 1 and 2 are diagram representations of one embodiment of the invention, illustrating first and second views thereof.
Figure 2:
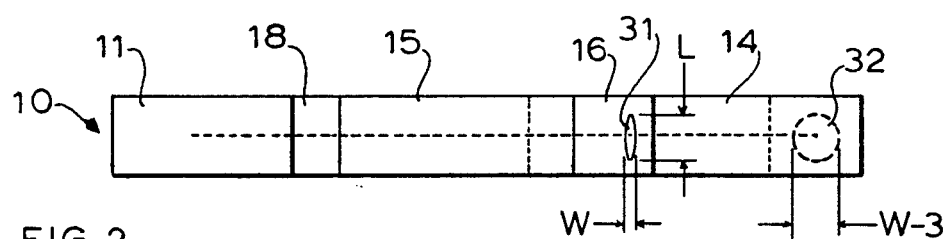

Referring now to FIGS. 1 and 2, a member 10 of a light conducting material 30, having a predetermined index of refraction, within an air environment 29, is shown as having four light reflecting surfaces 11, 12, 13 and 14, and a light refracting interface 15 of the media 29 and 30. First and second prisms 16 and 17, each having an index like that of member 10 material, are supported, respectively, adjacent the surfaces 14 and 13.

Each of the reflecting surfaces 11, 12, 13 and 14 is oriented one with respect to the other so as to establish an optical relationship between them and the refracting interface 15 whereby light entering the array either along a path 19 or along a path 20 will be reflected along an optical path therein forming a helix of plural revolutions 21, 22 and 23 between these input and output paths of the system.

Figure 3:
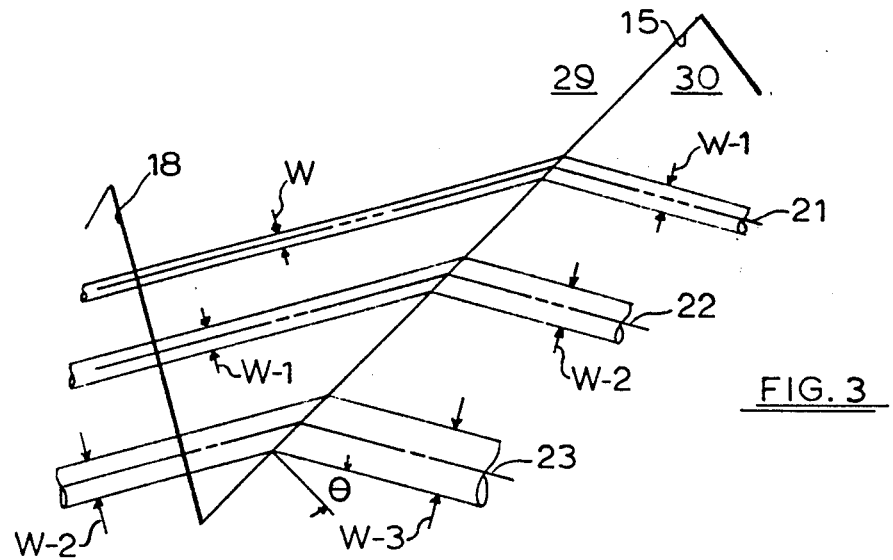
FIG. 3 is a detail of FIG. 1, further enlarged, and will be referred to in providing an understanding of the invention.

Light referred to herein includes radiant energy, preferably a properly polarized beam of radiant energy from a laser source, extending from infrared through the visible spectrum to ultraviolet. The angular relationship of the various surfaces within the system allows light along each revolution therein to be incident upon the interface 15 at a predetermined angle of incidence, preferably at the Brewster angle, whereby the beam of light will pass obliquely from one media to the other at the interface 15. Depending upon the manner in which the device is being used light input to the system may be directed along either the path 19 or the path 20. Referring now to FIG. 3, when entering along the path 20 a substantially collimated monochromatic beam of light along an initial revolution 23 will reach the interface 15 at an angle of incidence $\theta$ in relation to normal. The cross section of the beam can be understood as being circular and having a diameter, or width dimension, W-3. A passing of the beam obliquely from the relatively higher index of material 30 to air 29 at the interface 15, at an angle of refraction corresponding to the angle of incidence $\theta$, effects changes in the cross sectional dimensions of the beam from a circular to an elliptical shape and from a width dimension W-3 to a width dimension W-2. The latter dimension W-2, for example, being 60% of the dimension W-3 and of a correspondingly higher density.

This modified beam thereupon enters the material 30 perpendicular to the surface 18, followed by reflections at the surfaces 11, 12, 13 and 14 so as to complete the initial revolution 23 and begin the revolution 22. A second passing of the beam from material 30 at the interface 15 effects a further change in the elliptical shaped beam from the width W-2 to a width W-1, another 40% change in width and corresponding increase in density. Upon starting the third revolution 21 a third passing of the beam from material 30 at the interface 15 effects a still further change in the elliptical shaped beam from the width W-1 to a width W, representing another 40% change in the width and a corresponding increase in density. Upon completing the third revolution 21 the beam of light will pass beyond the limits of the system along the path 19. The foregoing progression of changes effect a 4.6 to 1 reduction in at least one cross sectional dimension of a circular beam directed along the path 20 of the system, without the least of aberration and with light efficiency very close to unity. Slight losses likely to occur at the surface 18 and light entry faces of prisms 16 and 17 can be avoided by appropriate optical coating.

The system 10 will also operate in reverse. Allowing the elliptical shaped beam 31 at the output surface of prism 16 to be directed along path 19 of a second system will return the beam to its original circular shape 32 upon entering prism 17. A further object of the invention is to direct the elliptical shaped beam 31 along the input path 20 of a second system 10 (not shown) so as to reduce the lengthwise dimension L of the beam 31 to the dimension W thereof and thereby effect a circular shaped beam having a diameter equal to the dimension W. The optical path 19 of the first system of such pair of systems would be aligned with the optical path 20 of the second system, and the two systems would be displaced 90° about the aligned optical paths 19-20. The two systems 10, when operated in this manner, will effect a 4.6 to 1 reduction in the diameter of the original beam 32. And also effect a corresponding increase in the density of the smaller diameter beam. Additional revolutions of a beam within the systems will effect still further changes.

Referring now to FIGS. 4 and 5, first and second views of a further embodiment of the invention is illustrated, wherein first and second interfaces 15 and 15a are shown positioned within a array of light reflecting surfaces 11, 12, 13 and 14. The important difference found in this embodiment is in the use of more than one light refracting interface between a relatively higher index material 30 and the surrounding air environment. Instead of additional light beam entry and exit prisms, the surfaces 35 and 36 perpendicular to light beam paths 19 and 20 have been provided, as shown, in the member 50, which otherwise has a configuration like that of member 51. The use of two light refracting interfaces 15 and 15a, and but two revolutions of the beam within the system 10a provide a 7.7 to 1 change in the cross sectional dimensions of beam of light. Additional revolutions will, of course, effect a greater change if necessary. The manner in which this embodiment operates is very similar to that of the initial embodiment set forth herein.

Figure 6:
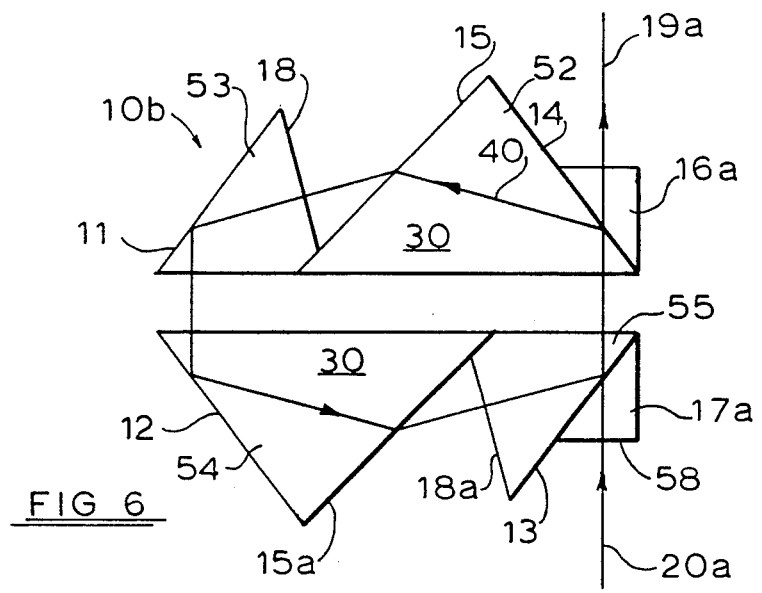
FIG. 6 and 7 are diagram representations of still another embodiment of the invention, illustrating first and second views.
Figure 7:
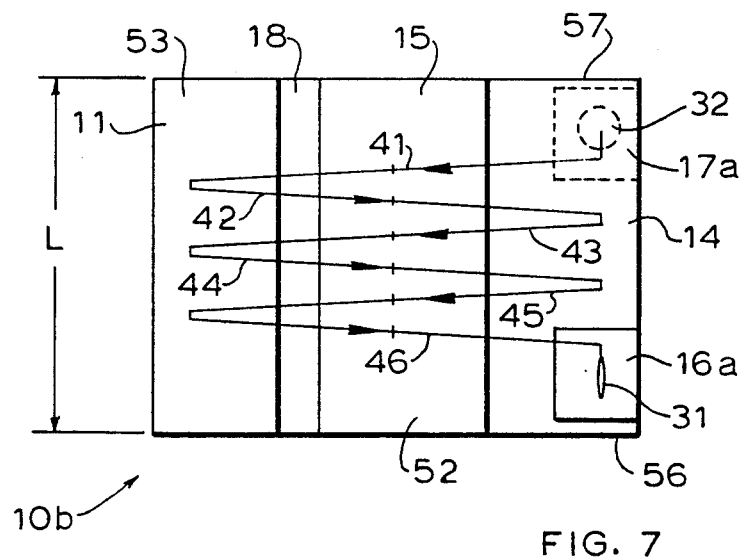
Figure 1:
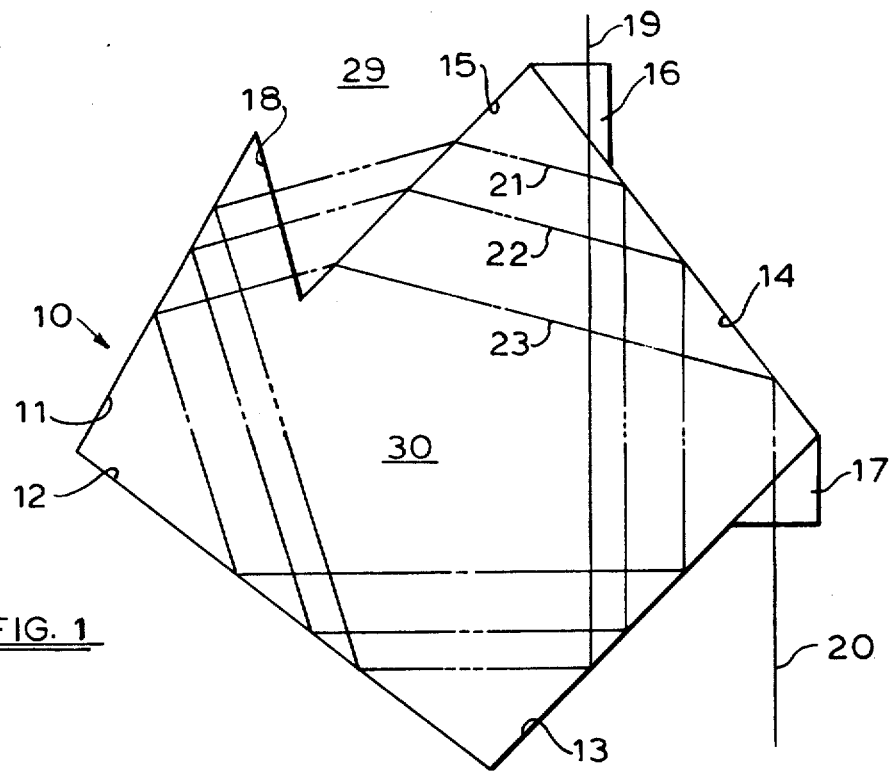
Figure 2:
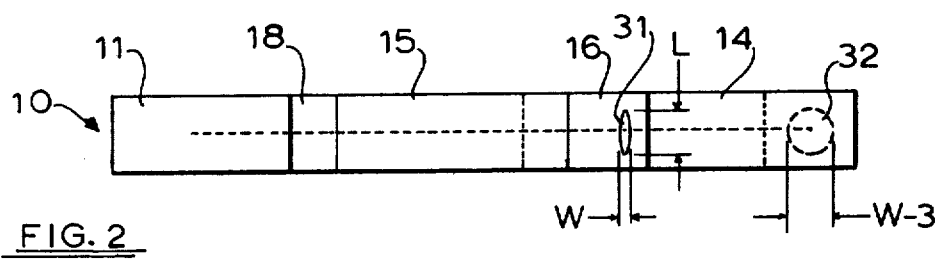
Figure 3:
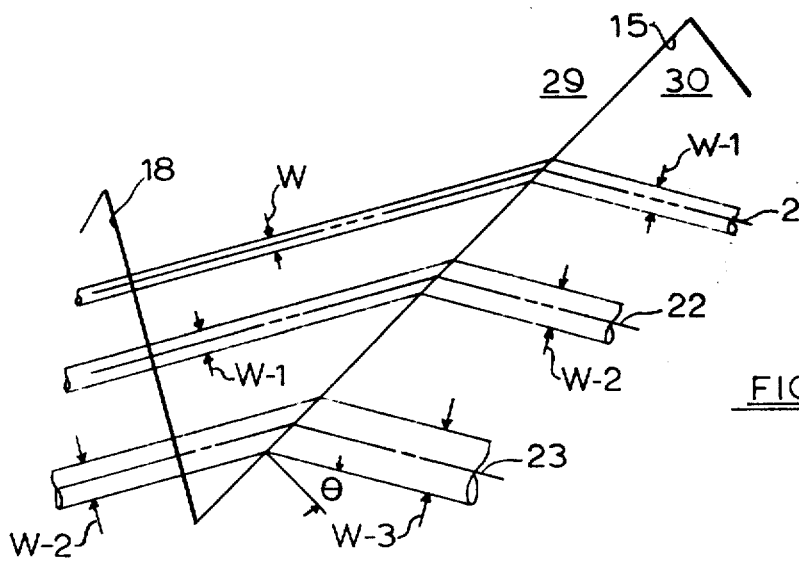
Figure 6:
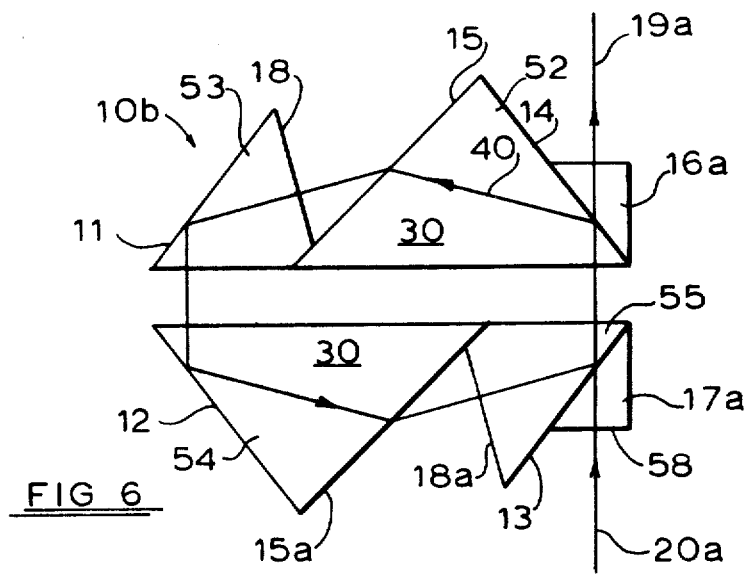
Figure 7:
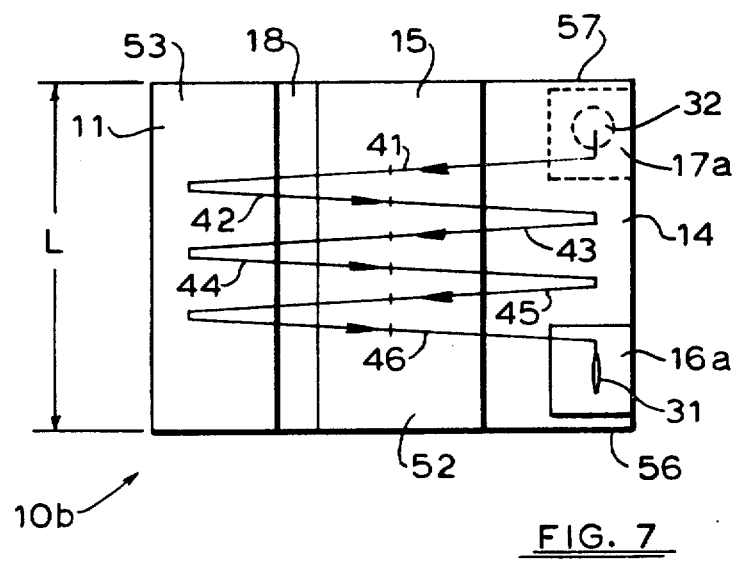

Referring now to FIGS. 6 and 7, first and second views of still another embodiment of the invention is shown, which can be operated in essentially the same manner as the previous embodiments herein. This system 10b includes an assembly of prismatic members 52, 53, 54 and 55, each having what will be referred to as a length dimension L, providing first and second light beam refracting interfaces 15 and 15a within an array of light reflecting surfaces 11, 12, 13 and 14. A prism 16a is intimately joined to the surface 14 of the member 52, at the one end 56 thereof, and having an index of refraction like that of member 52 material. Another prism 17a is likewise joined to the surface 13 of the member 55, at the opposite end 57 thereof, and having an index like that of member 55 material. The prisms 16a and 17a are used in connection with beam entry and exit requirements. A beam of light entering the system along path 20a will be directed along an optical path 40, as shown in FIG. 6, and thereupon exit along path 19a. The beam of light will be incident upon the entry surface 58 of prism 17a at an angle of incidence so as to allow the beam to follow the path 40 forming a helix of plural revolutions in the direction of the length L, as shown in FIG. 7, until having reached the point of exit through prism 16a. Light along segments 41, 43 and 45 of the path 40 encounter the interface 15 upon reflection from surface 14, while light along segments 42, 44 and 46 encounter interface 15a upon reflection from surface 12. Although the members 52 and 53 are drawn spaced from the members 54 and 55 they may be joined along their respective surfaces so as to form a more compact unit. And, instead of making a unit of this particular embodiment using the four individual members 52, 53, 54 and 55 it can, of course, be fashioned as illustrated in FIG. 1 using an individual member 10 of material 30, or, as illustrated in FIG. 4 using an assembly 10a having a pair of somewhat the same members of material 30. Through the use of two light refracting interfaces 15 and 15a in combination with four revolutions of the light beam cross sectional dimension changes in excess of 20 to 1 can be effected and, therefore, capable of reducing, for example, the diameter of a laser beam of light from a 0.020 inch dia. to less than 0.001 inch dia. when using two such systems in series, as hereinbefore noted.

It should be understood that the Figures of each of the embodiments have been drawn enlarged so as to simplify the description of the invenion and that each will require a minimum of bulk and space. It should also be understood by those skilled in the arts pertaining to the construction and application possibilities of the invention herei set forth, including the fact that the light reflecting surfaces may be mirrored or silver coated surfaces, that the embodiments herein illustrate in a very limited sense the usefulness of the invention, and that the invention includes other modifications and equivalents as they may be seen by those skilled in the arts, but still being within the scope of the appended claims.

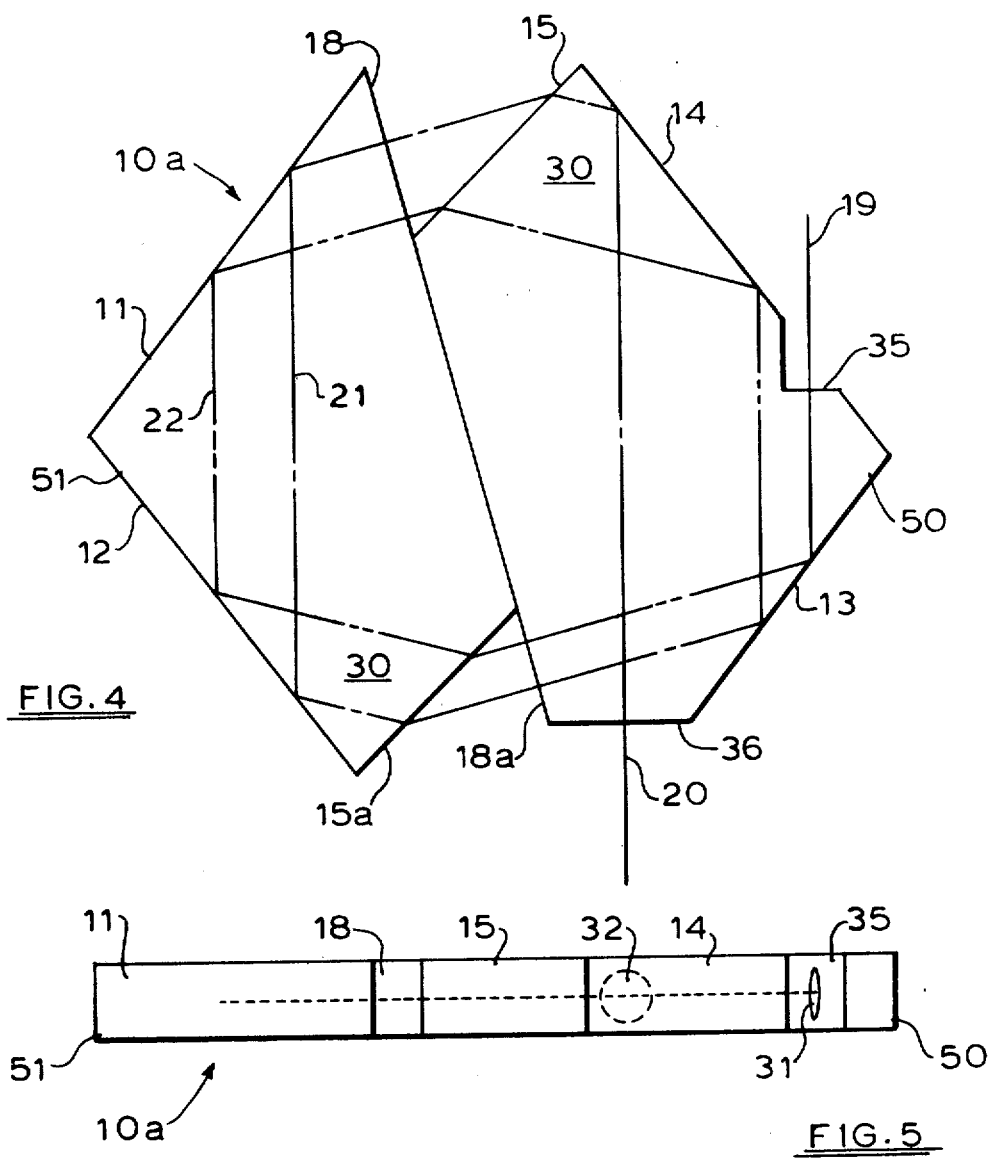

I claim:

1. An optical system for effecting changes in a cross sectional dimension of a beam of light along an optical path therein extending from a light input path to said system to a light output path from said system, comprising:

a. means for directing a substantially collimated monochromatic beam of light along said optical path within the system so as to establish an availability of said beam at a plurality of locations along said optical path for an effecting of a change in a cross sectional dimensions of said beam at each said location, light refracting means coincident with each said location and each said location representative of a beam dimension control position of said system;

b. said means for directing the beam along said optical path including a formation of light conducting material having a predetermined cross sectional configuration, length dimension, a first end and a second end, and presenting along said length dimension an array of outer surfaces of which a plurality are representative of individual light reflecting surface means and at least one of said outer surfaces is representative of a light refracting surface for providing a plurality of said light refracting means along the length dimension thereof between said first and second ends;

c. each surface of said array of surfaces angularly oriented one with respect to the other so as to provide an optical relationship between said input path and each said control position and between each said control position and said output path, said optical relationship allowing said beam to follow said optical path forming a helix of plural revolutions, each revolution of said helix extended along said length dimension in a side-by-side relationship from said input path to said output path;

d. each revolution of said helix including at least one of said beam dimension control positions and said light refracting means at each said control position effecting said change in the cross sectional dimension of said beam in the direction substantially perpendicular to said length dimension of said array of surfaces.

2. The invention as set forth in claim 1, wherein said change in the cross sectional dimension of said beam coincident with each said control position provides an increase in said cross sectional dimension of the beam in the direction substantially perpendicular to said dimension of said array.

3. The invention as set forth in claim 1, wherein said change in the cross sectional dimension of said beam coincident with each said control position provides a decrease in said cross sectional dimension of the beam in the direction substantially perpendicular to said length dimension of said array.

* * * * *

UNITED STATES PATENT AND TRADEMARK OFFICE
CERTIFICATE OF CORRECTION

PATENT NO. : 4,128,308
DATED : December 5, 1978
INVENTOR(S) : Joseph T. Mc Naney It is certified that error appears in the above—identified patent and that said Letters Patent are hereby corrected as shown below:

The sole sheet of drawing consisting of Figures 1 thru 4 should be deleted to insert the attached sheets of drawings therefor.

THIS CERTIFICATE OF CORRECTION APPLYS TO THE GRANT, exclusively.

*Signed and Sealed this*

*Eleventh* Day of *December 1979*

[SEAL]

*Attest:*

SIDNEY A. DIAMOND

*Attesting Officer*   *Commissioner of Patents and Trademarks*